United States Patent [19]
Milroy

[11] Patent Number: 6,084,570
[45] Date of Patent: Jul. 4, 2000

[54] COMPACT CURSOR CONTROLLER STRUCTURE FOR USE WITH LAPTOP, NOTEBOOK AND HAND-HELD COMPUTERS AND KEYBOARDS

[75] Inventor: Mark N. Milroy, Rawlins, Wyo.

[73] Assignee: Altra Corporation, Rawlins, Wyo.

[21] Appl. No.: 08/934,412

[22] Filed: Sep. 18, 1997

[51] Int. Cl.[7] .................................................... G09G 5/08
[52] U.S. Cl. ........................................ 345/157; 345/161
[58] Field of Search ................................. 345/157, 158, 345/160, 161; 200/5 R

[56] References Cited

U.S. PATENT DOCUMENTS

| | | | |
|---|---|---|---|
| 4,670,743 | 6/1987 | Zemke | 340/709 |
| 5,293,158 | 3/1994 | Soma | 345/161 |
| 5,760,764 | 6/1998 | Martinelli | 345/160 |

*Primary Examiner*—Richard A. Hjerpe
*Assistant Examiner*—Duc Dinh
*Attorney, Agent, or Firm*—Flehr Hohbach Test Albritton & Herbert LLP

[57] ABSTRACT

A compact cursor controller includes a housing having an opening through the top thereof. A controller structure is substantially disposed within the housing and has a puck extending through the opening and a first brush within the housing and a second brush within the housing. A printed circuit board is disposed within the housing and coupled to the first brush and the second brush and configured to generate a first sensor signal in response to movement of the first brush on a first conductive strip and to generate a second sensor signal in response movement of the second brush on a second conductive strip oriented perpendicular to the first conductive strip. A processor is coupled to the first conductive strip and the second conductive strip and configured to receive the first sensor signal and the second sensor signal to determine a position of the puck. The processor then sends a puck position signal to a computer. Advantages of the invention include compact size and a high degree of accurate cursor control. Moreover, the invention provides good ergonomics that reduces fatigue.

27 Claims, 6 Drawing Sheets

COMPACT CURSOR CONTROLLER STRUCTURE FOR USE WITH LAPTOP, NOTEBOOK AND HAND-HELD COMPUTERS AND KEYBOARDS

FIELD

The present invention relates to a compact cursor controller structure for use with laptop, notebook and hand-held computers and keyboards. In particular, the invention can be used with small computers to provide a cursor controller having improved comfort of use and accuracy of cursor control over existing joystick, j-key, track-ball, touch pad, and other conventional technologies.

BACKGROUND

Known types of cursor controllers for laptop computers include a j-key, which is a small joystick adjacent to the j key on the computer keyboard, a track-ball and a touch pad that responds to a user's finger impressions. These devices have an advantage for laptop computers over a conventional mouse because these devices are easily constructed into the laptop computer keyboard area and do not require the relatively large area used by a mouse and mouse pad. However, these devices do not provide the same high degree of cursor control on the display that can be obtained with a mouse. For example, a mouse is preferred for drafting figures where position of the cursor must be accurately controlled. Thus, a limitation of known small cursor controllers is that they do not provide sufficient control over the accuracy of the cursor on the computer display.

A goal of the invention is to overcome the identified limitations and to provide a compact cursor controller that combines both small size and a high degree of accurate cursor control.

SUMMARY

The invention overcomes the identified problems and provides a compact cursor controller with fast, comfortable and accurate cursor control. An exemplary embodiment of a compact cursor controller includes a housing having an opening through the top thereof. A controller structure is substantially disposed within the housing and has a puck extending through the opening and a first brush within the housing and a second brush within the housing. A printed circuit board is disposed within the housing and coupled to the first brush and the second brush and configured to generate a first sensor signal in response to movement of the first brush on a first conductive strip and to generate a second sensor signal in response movement of the second brush on a second conductive strip oriented perpendicular to the first conductive strip. A processor is coupled to the first conductive strip and the second conductive strip and configured to receive the first sensor signal and the second sensor signal to determine a position of the puck. The processor then sends a puck position signal to a computer.

In one embodiment, the housing is less than approximately 6.5 cm wide, 4.88 cm deep and 0.85 cm high, and the opening is approximately 2.27 cm by 1.87 cm. This small design allows the puck to be manipulated by the user by moving his fingers and without moving the wrist. Since the puck is small and has low mass, the fingers can easily manipulate the puck. This configuration is very ergonomic and reduces fatigue and repetitive motion problems with the user.

Advantages of the invention include compact size and a high degree of accurate cursor control. Moreover, the invention provides good ergonomics that reduces fatigue.

BRIEF DESCRIPTION OF THE FIGURES

Additional advantages of the invention will become apparent upon reading the following detailed description and upon reference to the drawings, in which.

DETAILED DESCRIPTION

Exemplary embodiments are described with reference to specific configurations and dimensions. Those skilled in the art will appreciate that various changes and modifications can be made while remaining within the scope of the claims.

Figure 1:
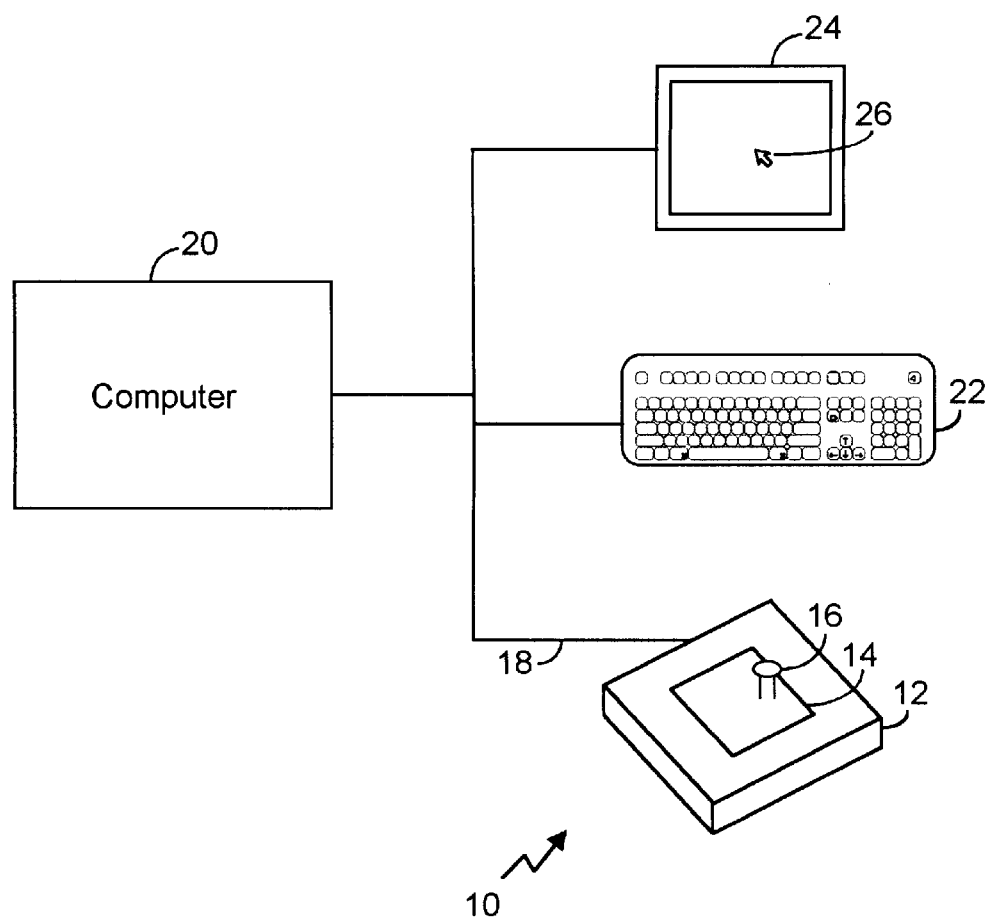
FIG. 1 depicts a compact cursor controller according to an embodiment of the invention.

FIG. 1 depicts a compact cursor controller 10 according to an embodiment of the invention. Controller 10 includes a housing 12 having an opening 14 through the top. A puck 16 extends up through the opening 14 and is intended for manipulation by a user. The controller 12 is coupled via cable 18 to a computer 20. The computer is also coupled to a keyboard 22 and display 24. Display 24 has a display cursor 26 that serves to highlight a position on the display. The invention provides that manipulation of the puck 16 by the user causes the cursor 26 to be correspondingly manipulated by the computer 20 on the display 24. Such function is known in the art and is described, for example, in U.S. Pat. No. 4,935,728, incorporated herein by reference.

Figure 2:
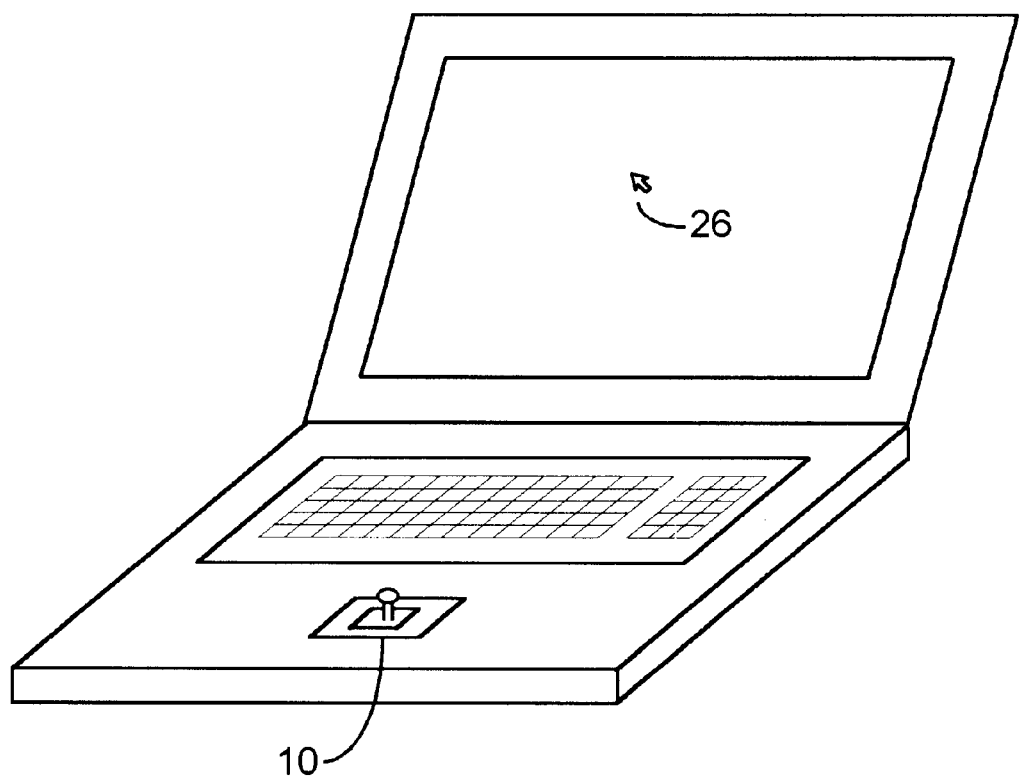
FIG. 2 depicts a compact cursor controller installed in a notebook computer according to an embodiment of the invention.

The invention focuses on the physical structure of the compact cursor controller 10. As shown in FIG. 1, the invention can be configured as a stand alone unit as a replacement for a mouse and communicate with the computer over cable 18. Alternatively, the invention can be incorporated into a keyboard for use with a desktop computer. FIG. 2 depicts the compact cursor controller 10 installed in a notebook computer. The housing 12 is designed to be compact enough for production in laptop computers, notebook computers, hand-held computers and other types of computers. The compact cursor controller can be positioned adjacent to the keyboard, as shown, or can alternately be placed in any region on the keyboard surface such as above the keyboard or the right or left of the keyboard, or can alternately be placed on a region that extends from or pops-out from the keyboard area. If the invention is incorporated into a laptop, notebook or hand-held computer, the invention can use a connector that couples directly to an internal printed circuit board, such as the motherboard, eliminating the need for cable 18.

Figure 3:
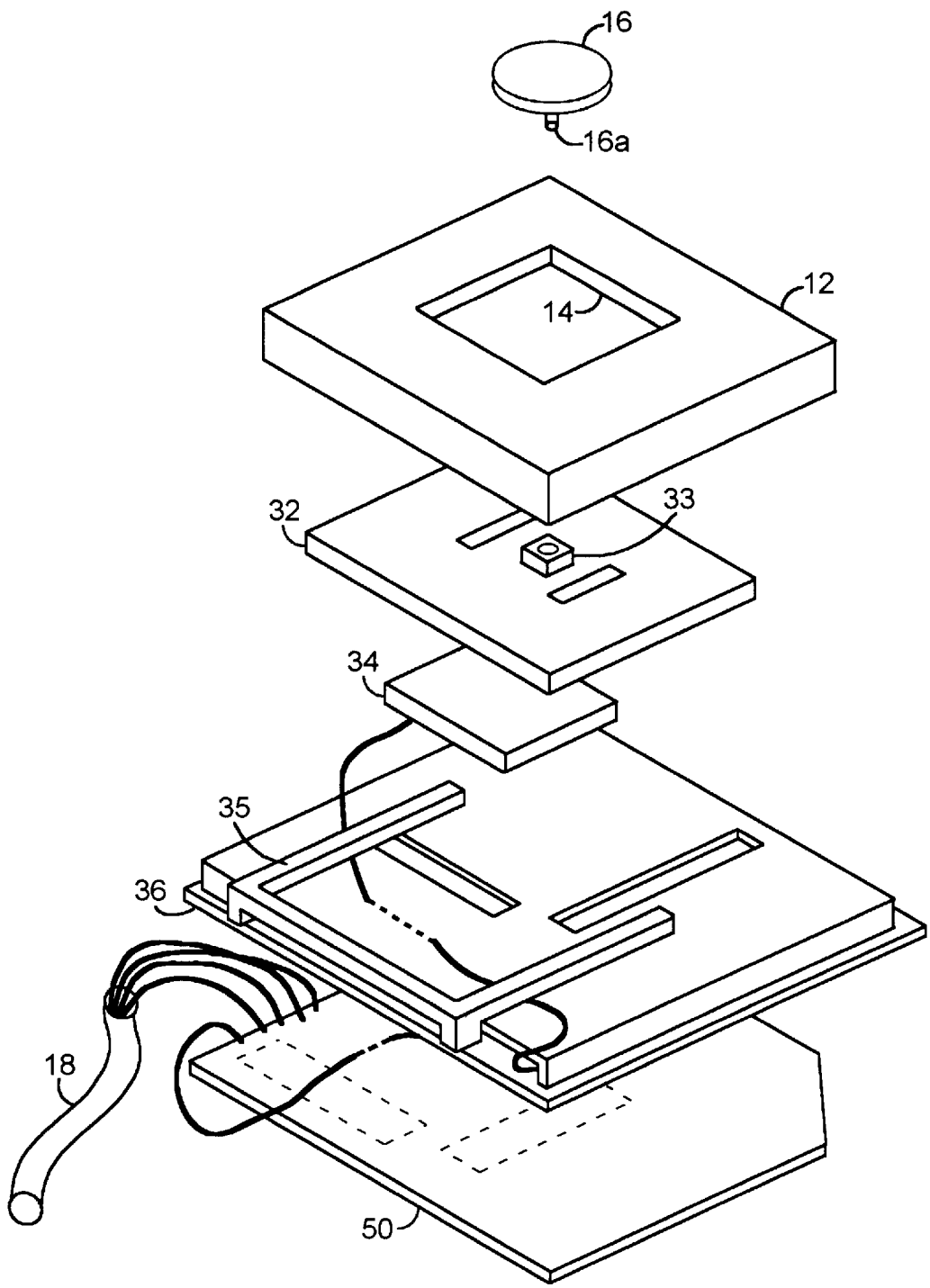
FIG. 3 depicts an exploded view of a controller structure according to an embodiment of the invention.
Figure 4:
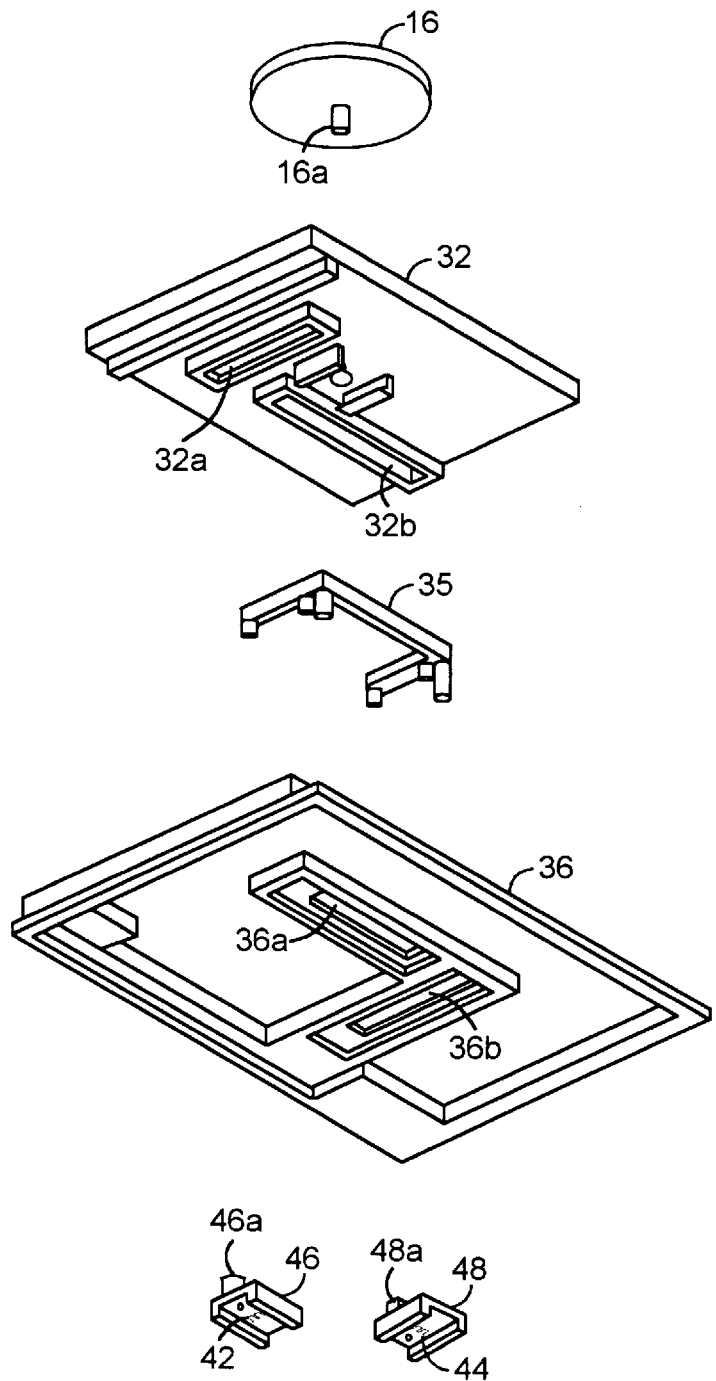
FIG. 4 depicts a second exploded view of a controller structure according to an embodiment of the invention.

FIGS. 3 and 4 depict an exploded view of a controller structure according to an embodiment of the invention. The controller structure is intended to fit substantially within housing 12. Puck 16 includes a protrusion 16a that connects to a plate 32 via opening 33 coupled to a select switch 34. Plate 32 is a moveable plate that includes a first recess 32a and a second recess 32b. Recesses 32a and 32b have peripheral protrusions that support plate 32 above guide 35. Guide 35 serves to maintain an orientation for plate 32 so that the recesses 32a and 32b smoothly move in their respective directions as plate 32 is moved by the puck 16. Guide 35 also serves as a holder for the wires to select switch 34. Guide 35 is in contact with to plate 36 having slots 36a and 36b. A first brush 42 is disposed within holder 46 that has a protrusion 46a designed to reside in recess 32a. A second brush 44 is disposed within holder 48 that has a protrusion 48a designed to reside in recess 32b. In this manner, when the puck 16 is moved by the user, the movement translates to plate 32 (recesses 32a and 32b) that in turn moves holders 46 and 48 containing brushes 42 and 44. Note that the recesses 32a and 32b are positioned perpendicular to one another and that the slots 36a and 36b are perpendicular to one another but normal to the recesses 32a and 32b. This is because the holders 46 and 48 are designed to move freely in recesses 32a and 32b within the bounds allowed by slots 36a and 36b. The result is that the brushes become uniquely positioned for each unique puck position. A printed circuit board 50 is positioned below the brushes 42 and 44 and attached to the plate 36. The printed circuit board includes features that can identify the positions of the brushes 42 and 44, as explained below.

The invention is designed to be small and compact. As such, in one embodiment, the dimensions for the housing are in the range of approximately 6.5 cm wide, 4.88 cm deep and 0.85 cm high, and the opening is approximately 2.27 cm by 1.87 cm. In another embodiment, the dimensions for the housing are in the range of approximately 7 cm wide, 5 cm deep and 0.5 cm high, and the opening is approximately 2.25 cm by 2 cm.

Figure 5:
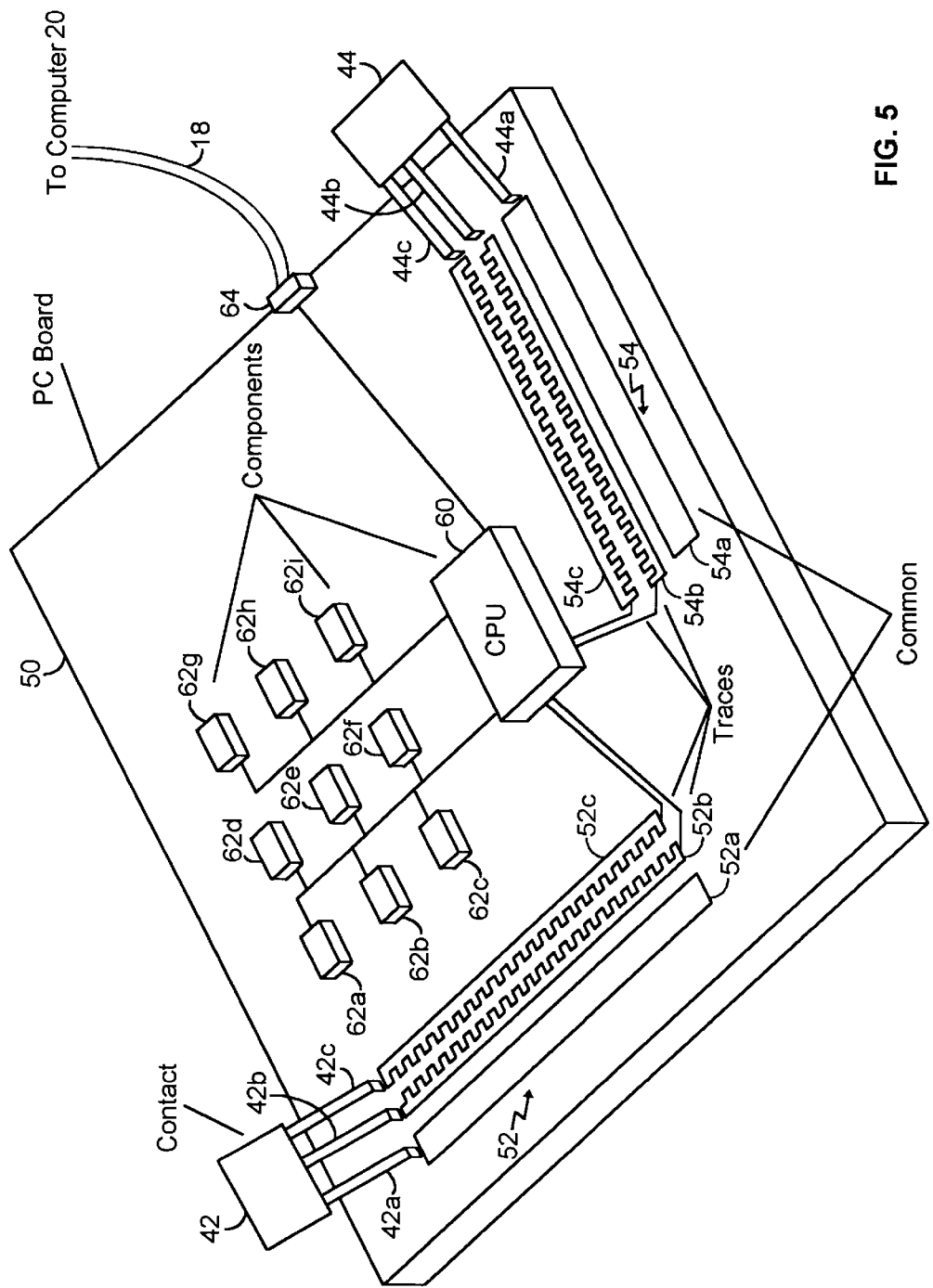
FIG. 5 depicts an internal view of brushes, a printed circuit board and a processor according to an embodiment of the invention.
Figure 6:
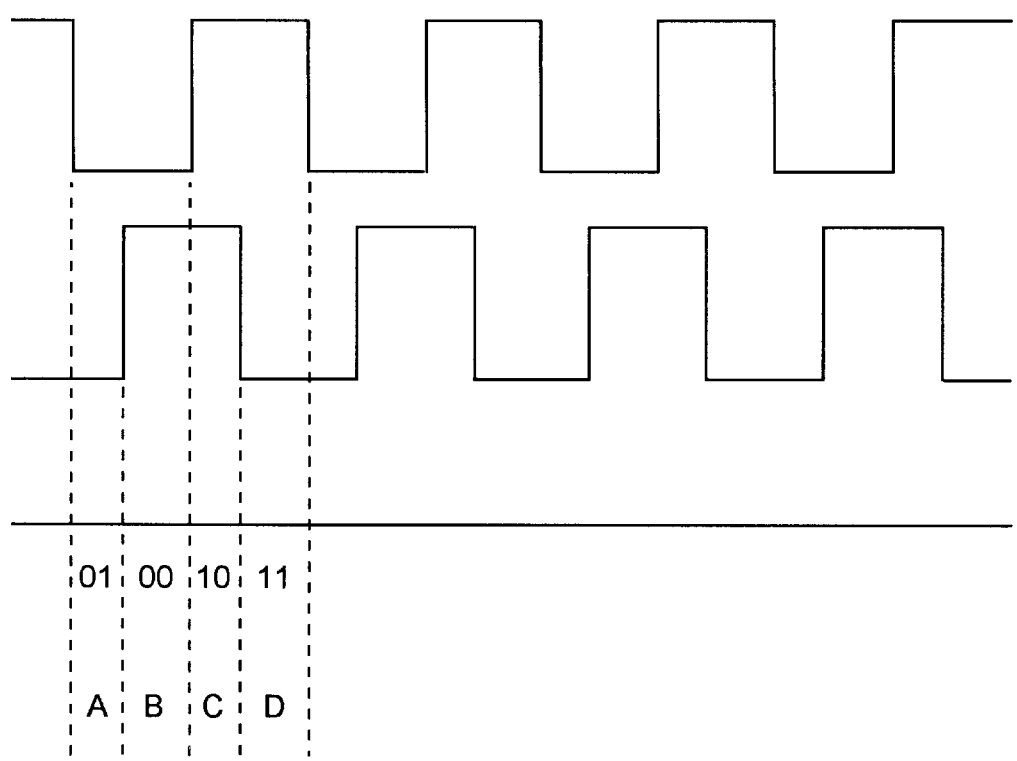
FIG. 6 is a magnified view of a section of the conductive strips on a printed circuit board according to an embodiment of the invention.

FIGS. 5 and 6 depict an internal view of brushes, a printed circuit board and a processor according to an embodiment of the invention. A printed circuit board 50 (FIG. 3) attaches to the bottom of plate 36. The first brush 42 has three parts 42a–42c and the second brush 44 has three parts 44a–44c. The printed circuit board 50 includes a first conductive strip 52 and a second conductive strip 54 oriented perpendicular to the first conductive strip. These strips 52 and 54 are etched printed circuit patterns or silk-screened conductive patterns. The first strip 52 includes a first sub-strip 52a for ground, a second sub-strip 52b having a plurality of fingers laid on the printed circuit board and a third sub-strip 52c having a having a plurality of fingers laid on the printed circuit board staggered in position with the second sub-strip 52b. The sub-strips 52a–52c contact respective parts of the first brush 42a–42c. The second conductive strip 54 includes a first sub-strip 54a for ground, a second sub-strip 54b having a plurality of fingers laid on the printed circuit board and a third sub-strip 54c having a having a plurality of fingers laid on the printed circuit board staggered in position with the second sub-strip 54b. The sub-strips 54a–54c contact respective parts of the second brush 44a–44c.

The first strip 52 generates a first sensor signal in response to movement of the first brush 42 on the first strip. The first sensor signal on strips 52b and 52c is pulled-up through a pull-up resistor. The first sensor signal is generated when the brush parts 42a–42c complete a circuit from the ground sub-strip 52a to the sub-strips 52b and 52c, pulling down the signals on strips 52b and 52c to ground. In particular, the sub-strip 52b generates a sub-signal in response to movement of the part 42b and the sub-strip 52c generates a sub-signal in response to movement of the part 42c. The second strip 54 generates a second sensor signal in response to movement of the second brush 44 on the second strip. The second sensor signal on strips 52b and 52c is pulled-up through a pull-up resistor. The second sensor signal is generated when the brush parts 44a–44c complete a circuit from the ground sub-strip 54a to the sub-strips 54b and 54c, pulling down the signals on strips 54b and 54c. In particular, the sub-strip 54b generates a sub-signal in response to movement of the part 44b and the sub-strip 54c generates a sub-signal in response to movement of the part 44c.

A processor 60 is coupled to the first conductive strip 52 the second conductive strip 54 and is configured to receive the first sensor signal and the second sensor signal to determine a position of the puck 16. In one embodiment, the processor is configured to receive the first sub-signal from the sub-strip 52b and the second sub-signal from the sub-strip 52c and to determine a direction of movement of the first brush 42 on the first conductive strip 52. This is performed by comparing a phase of the first sub-signal and the second sub-signal. If the phase comparison is positive, the brush 42 is being moved on the strip 52 from left to right, and if the phase comparison is negative, the brush 42 is being moved on the strip from right to left. The processor processes the signals from strip 54 in the same way to determine position and motion.

Referring to FIG. 6, the printed circuit board conductive strips and the staggered positions of the fingers are described. The fingers are made of ¼ or ⅛ oz. copper and the resolution of the traces can be brought down to 4 mil (0.004 inch) fingers and gaps. Since the two sub-strips are staggered in position as shown in FIG. 6, this provides approximately 500 distinct graduations per inch. Unique data is generated by the strips and will be received by the processor 60 based on the brush position. For example, if the brush is in position A the sub-signals are 01, if the brush is in position B the sub-signals are 00, if the brush is in position C the sub-signals are 10, and if the brush is in position D the sub-signals are 11. This technique provides a high degree of mechanical precision (e.g resolution to 0.002 inch) at very low cost. Moreover, the pressure with which the brushes impress on the conductive strips is controlled by the construction and dimensions of the brushes and the cantilever spring constant.

Once the processor 60 determines the position of the puck, by determining the position of the brushes 42 and 44 on strips 52 and 54, the processor informs the computer of the position and the cursor 26 on the display is adjusted by the computer accordingly. Also, the processor can determine movement direction of the brushes on the conductive strips by comparing the data sequence to a known directional data sequence. For example, a sequence of 01, 00, 10 and 11 means that the brushes are traveling from left to right in FIG. 6. Likewise, a sequence of 11, 10, 00 and 01 means that the brushes are traveling from right to left in FIG. 6.

The processor 60 can further communicate with other components 62a–62i on the printed circuit board. These components can include switches for buttons that are positioned in the housing or on adjacent locations in order to inform the computer that the cursor movement should be tracked. Also, the processor can inform the computer that the identified position is to be selected for a function such as a hyper-link. These functions are well known in the art.

Advantages of the invention include compact size and a high degree of accurate cursor control.

Having disclosed exemplary embodiments and the best mode, modifications and variations may be made to the disclosed embodiments while remaining within the scope of the invention as defined by the following claims.

What is claimed is:

1. A compact cursor controller comprising:

a housing having an opening through the top thereof;

a controller structure substantially disposed within said housing and having a puck that includes a puck protrusion extending through said opening and a first brush within said housing coupled to said puck and a second brush within said housing coupled to said puck;

a printed circuit board disposed within said housing and coupled to said first brush and said second brush and configured to generate a first sensor signal in response to movement of said first brush on a first conductive strip and to generate a second sensor signal in response to movement of said second brush on a second conductive strip oriented perpendicular to said first conductive strip; and a processor coupled to said first conductive strip and said second conductive strip and configured to receive said first sensor signal and said second sensor signal to determine a position of said puck;

wherein said first conductive strip includes a first sub-strip having a plurality of fingers laid on said printed circuit board and configured to contact said first brush and to generate a first binary sub-signal in response to movement of said first brush on said first sub-strip, and a second sub-strip having a plurality of fingers laid on said printed circuit board staggered in position with said first sub-strip fingers and configured to contact said first brush and to generate a second binary sub-signal in response to movement of said first brush on said second sub-strip wherein said first binary sub-signal and said second binary sub-signal create at least four possible position codes;

wherein said second conductive strip includes a third sub-strip having a plurality of fingers laid on said printed circuit board and configured to contact said second brush and to generate a third binary sub-signal in response to movement of said second brush on said third sub-strip, and a fourth sub-strip having a plurality of fingers laid on said printed circuit board staggered in position with said third sub-strip fingers and configured to contact said second brush and to generate a fourth binary sub-signal in response to movement of said second brush on said fourth sub-strip wherein said third binary sub-signal and said fourth binary sub-signal create at least four possible position codes; and wherein said processor is configured to receive said first binary sub-signal and said second binary sub-signal and to determine a direction of movement of said first brush on said first conductive strip, and to receive said third binary sub-signal and said fourth binary sub-signal and to determine a direction of movement of said second brush on said second conductive strip.

2. The compact cursor controller of claim 1, wherein:

said processor is configured to determine a direction of movement of said first brush on said first conductive strip by comparing a phase of said first binary sub-signal and said second binary sub-signal, and to determine a direction of movement of said second brush on said second conductive strip by comparing a phase of said third binary sub-signal and said fourth binary sub-signal.

3. The compact cursor controller of claim 2, wherein:

said first conductive strip is constructed of a plurality of fingers having approximately 500 graduations per inch; and said second conductive strip is constructed of a plurality of fingers having approximately 500 graduations per inch.

4. The compact cursor controller of claim 2, wherein:

said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

5. The compact cursor controller of claim 1, wherein:

said housing is approximately 6.5 cm wide, 4.88 cm deep and 0.85 cm high; and said opening is approximately 2.27 cm by 1.87 cm.

6. The compact cursor controller of claim 1, wherein:

said housing is less than approximately 7 cm wide, 5 cm deep and 0.5 cm high; and said opening is less than approximately 2.25 cm by 2 cm.

7. The compact cursor controller of claim 1, wherein:

said first conductive strip is constructed of a plurality of fingers having approximately 500 graduations per inch; and said second conductive strip is constructed of a plurality of fingers having approximately 500 graduations per inch.

8. The compact cursor controller of claim 1, wherein:

said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

9. The compact cursor controller of claim 1, wherein:

said first brush is disposed in a first holder and said second brush is disposed in a second holder wherein said first brush and said second brush are disposed to maintain a predetermined thickness with wear;

said first holder includes an upward protrusion configured to travel through a first opening in a first plate and to mate with a first recess in a second plate and said second holder includes an upward protrusion configured to travel through a second opening in said first plate and to mate with a second recess in said second plate; and wherein said puck protrusion is configured to mate with a recess on opposite side of said first recess and said second recess of said second plate.

10. The compact cursor controller of claim 9, wherein:
said first plate is fixed and said first opening is an elongated opening and said second opening is an elongated opening oriented perpendicular to said first opening; and
said second plate is a moveable plate and said first recess is an elongated recess and said second recess is an elongated recess oriented perpendicular to said first recess.

11. The compact cursor controller of claim 10, wherein:
said first opening is oriented perpendicular to said first recess and said second opening is oriented perpendicular to said second recess.

12. The compact cursor controller of claim 9, wherein:
said housing is less than approximately 6.5 cm wide, 4.88 cm deep and 0.85 cm high; and
said opening is less than approximately 2.27 cm by 1.87 cm.

13. The compact cursor controller of claim 9, wherein:
said housing is less than approximately 7 cm wide, 5 cm deep and 0.5 cm high; and
said opening is less than approximately 2.25 cm by 2 cm.

14. The compact cursor controller of claim 9, wherein:
said first conductive strip is constructed of a plurality of fingers having approximately 500 graduations per inch; and
said second conductive strip is constructed of a plurality of fingers having approximately 500 graduations per inch.

15. The compact cursor controller of claim 9, wherein:
said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and
said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

16. The compact cursor controller of claim 9, further comprising:
a select switch coupled to said puck and configured to generate a switch signal responsive to downward pressure on said puck.

17. The compact cursor controller of claim 9, wherein:
said predetermined thickness is approximately 0.004 inch.

18. The compact cursor controller of claim 1, further comprising:
a select switch coupled to said puck and configured to generate a switch signal responsive to downward pressure on said puck.

19. A compact cursor controller comprising:
a housing having an opening through the top thereof;
a controller structure substantially disposed within said housing and having a puck that includes a puck protrusion extending through said opening and a first brush within said housing coupled to said puck and a second brush within said housing coupled to said puck;
a printed circuit board disposed within said housing and coupled to said first brush and said second brush and configured to generate a first sensor signal in response to movement of said first brush on a first conductive strip and to generate a second sensor signal in response to movement of said second brush on a second conductive strip oriented perpendicular to said first conductive strip; and
a processor coupled to said first conductive strip and said second conductive strip and configured to receive said first sensor signal and said second sensor signal to determine a position of said puck;
wherein said first brush is disposed in a first holder and said second brush is disposed in a second holder wherein said first brush and said second brush are disposed to maintain a predetermined thickness with wear;
wherein said first holder includes an upward protrusion configured to travel through a first opening in a first plate and to mate with a first recess in a second plate and said second holder includes an upward protrusion configured to travel through a second opening in said first plate and to mate with a second recess in said second plate; and
wherein said puck protrusion is configured to mate with a recess on opposite side of said first recess and said second recess of said second plate.

20. The compact cursor controller of claim 19, wherein:
said first plate is fixed and said first opening is an elongated opening and said second opening is an elongated opening oriented perpendicular to said first opening; and
said second plate is a moveable plate and said first recess is an elongated recess and said second recess is an elongated recess oriented perpendicular to said first recess.

21. The compact cursor controller of claim 20, wherein:
said first opening is oriented perpendicular to said first recess and said second opening is oriented perpendicular to said second recess.

22. The compact cursor controller of claim 19, wherein:
said predetermined thickness is approximately 0.004 inch.

23. The compact cursor controller of claim 19, wherein:
said housing is approximately 6.5 cm wide, 4.88 cm deep and 0.85 cm high; and
said opening is approximately 2.27 cm by 1.87 cm.

24. The compact cursor controller of claim 19, wherein:
said housing is less than approximately 7 cm wide, 5 cm deep and 0.5 cm high; and
said opening is less than approximately 2.25 cm by 2 cm.

25. The compact cursor controller of claim 19, wherein:
said first conductive strip is constructed of a plurality of fingers having approximately 500 graduations per inch; and
said second conductive strip is constructed of a plurality of fingers having approximately 500 graduations per inch.

26. The compact cursor controller of claim 19, wherein:
said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

27. The compact cursor controller of claim 19, further comprising:

a select switch coupled to said puck and configured to generate a switch signal responsive to downward pressure on said puck.

* * * * *